Aug. 13, 1963

G. D. HUNTER 3,100,654

TRACTOR CULTIVATOR MOUNTING

Filed March 19, 1962

INVENTOR.
GEORGE D. HUNTER
BY

AGENT

INVENTOR.
GEORGE D. HUNTER
AGENT

United States Patent Office 3,100,654
Patented Aug. 13, 1963

3,100,654
TRACTOR CULTIVATOR MOUNTING
George D. Hunter, Des Moines, Iowa, assignor to Deere & Company, Moline, Ill., a corporation of Delaware
Filed Mar. 19, 1962, Ser. No. 180,454
5 Claims. (Cl. 280—412)

This invention relates to tractor mounted implements, and more particularly to cultivators carried by the front portion of a tractor.

It is an object of the present invention to provide new and improved means to mount an implement to a tractor whereby the implement is adapted to swing about a horizontally disposed axis adjacent the tractor. Another object of this invention is to provide mounting means that permit an implement to swing about a horizontally disposed axis adjacent the tractor when it is in its working position sideward of the tractor, and to be swung about a vertically disposed axis when the implement is moved into its transport position forwardly of the tractor. Another object is to provide means to hold or lock the implement in its transport position. A still further object of this invention is to provide means to hold the implement in its working position, said means including a portion that is readily releasable to permit the implement to be swung into its transport position. Another object of the present invention is to provide mounting means which are simple in structure, sturdy in construction, economical to manufacture and assemble, and which are highly effective in action.

These and other objects and advantages of the present invention will become apparent to those skilled in the art as the nature of the invention is better understood from the following detailed description as illustrated in the accompanying drawings.

Figure 1:
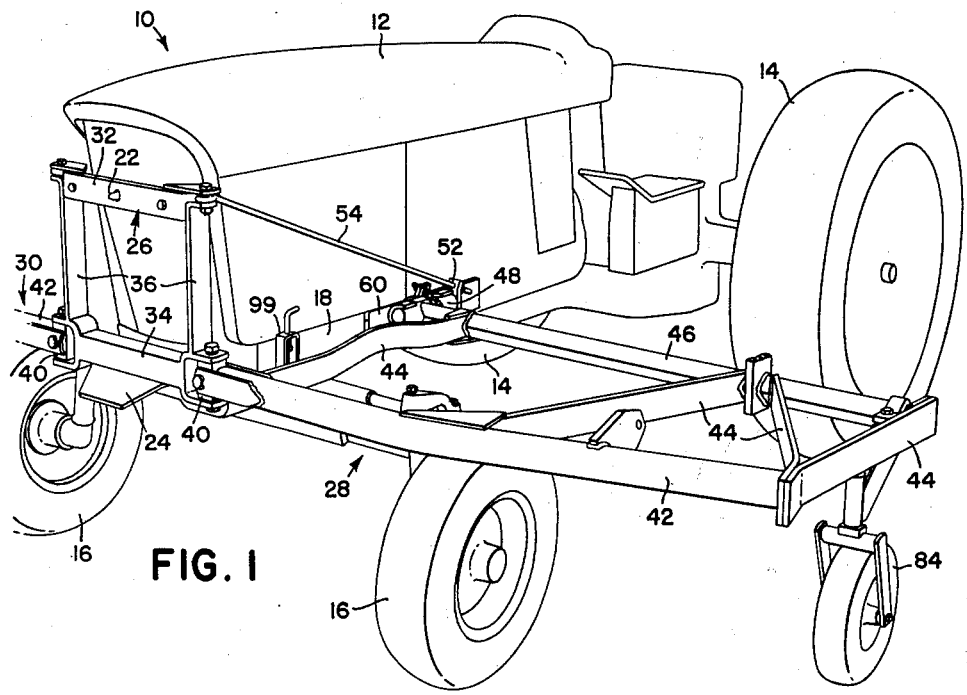
FIG. 1 is a detail view of the left front portion of a tractor carrying an implement which is mounted with applicant's new and improved mounting means.
Figure 2:
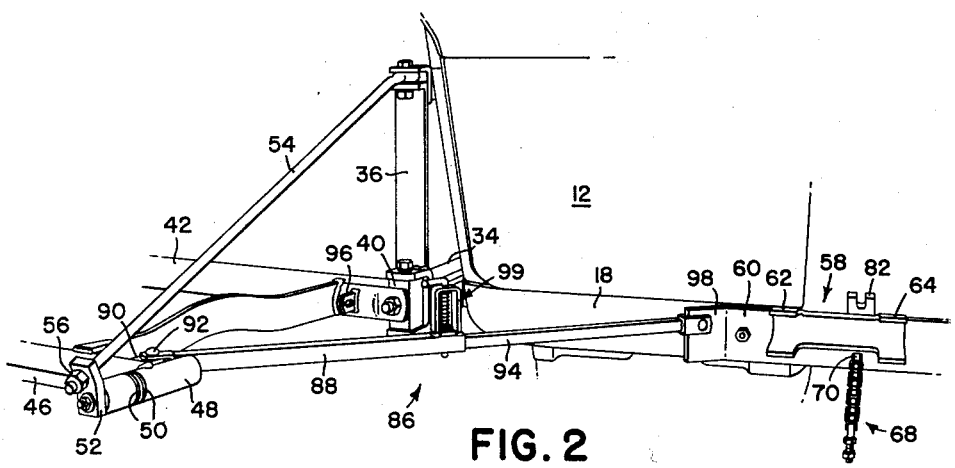
FIG. 2 is a view similar to FIG. 1 showing a portion of the implement swung into its transport position, the means to hold the implement in its transport position being shown in its extended locking position.
Figure 3:
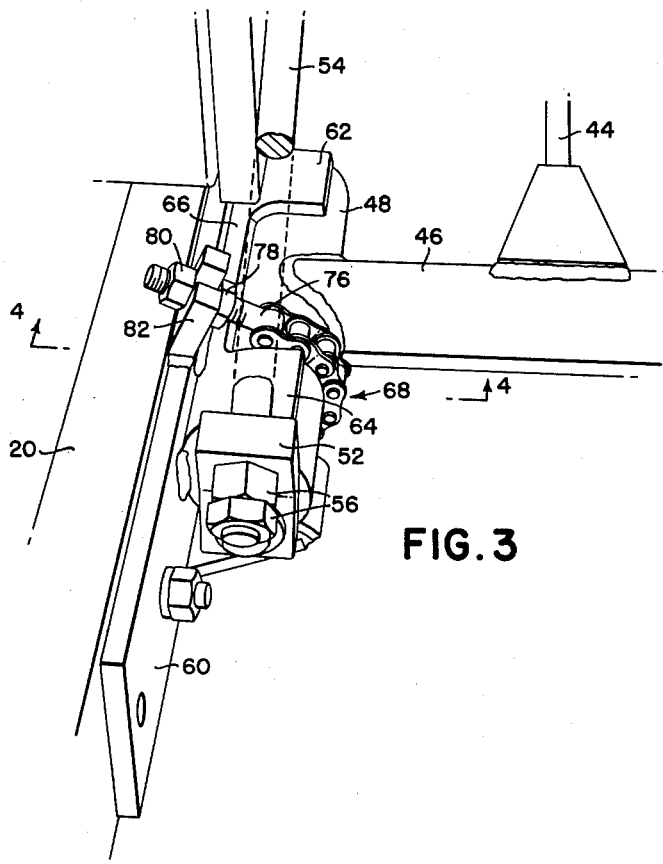
FIG. 3 is a view of the right hand side of the tractor showing the means to hold the implement in its working position.

Referring first to FIG. 1, the present invention has been illustrated as incorporated in an implement frame especially adapted for attachment to a four-wheel tractor having relatively widely spaced front wheels. The tractor is indicated in its entirety by the reference numeral 10 and includes a relatively narrow body 12 supported at its rear end in a conventional manner by rear wheels 14, and supported at its front portion by front wheels 16. The tractor body includes left hand and right hand side rails 18 and 20, respectively, as best seen in FIGS. 2 and 3. Mounted on the front portion of the tractor is a mounting structure including an adapter support pin 22 and a coupling plate 24.

The implement in which the principles of the present invention are incorporated includes a center section 26 which is adapted to be secured to the mounting structure 22, 24 at the front end of the tractor, and left and right hand outrigger frame sections 28 and 30 respectively, only the left hand frame section being fully illustrated in FIG. 1. The center section of the implement has upper and lower frame sections 32 and 34, and left and right hand vertically extending frame members 36 and 38, respectively, which are rigidly secured to the upper and lower frame sections. Mounted on each side of the lower frame section 34 of the center section of the implement are universal joints 40 to which are secured the forward transverse frame members 42 of the outrigger frame sections 28 and 30.

Referring now to the left hand section 28 only, the right hand section 30 having substantially the same structure, rearwardly extending frame members 44 are secured at their forward ends to the associated forward transverse frame members 42. Secured to the rear of each of the rearwardly extending frame members 44 is a rear transverse frame member 46, which carries at its inward end a first coupling means 48. This element consists of a horizontally disposed cylindrical element having two peripheral grooves 50. Mounted on the rear end of the cylindrical element 48 is an upstanding bracket member 52. Rotatably secured to the upper frame section of the center section of the implement is a stay bolt 54 which extends downwardly and passes through an aperture in bracket 52 and is secured thereto by nuts 56, as best shown in FIG. 3.

Figure 4:
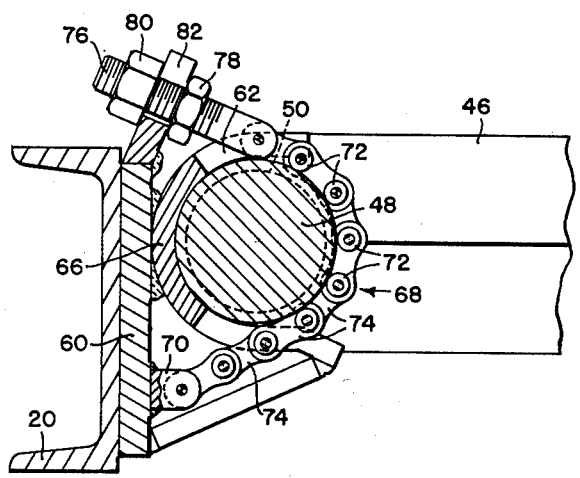
FIG. 4 is a cross section taken through the coupling member illustrated in FIG. 3 on line 4—4.

Mounted to the left hand and right hand side rails 18 and 20, respectively, are second coupling means 58. As best shown in FIGS. 3 and 4, the second coupling means includes a plate 60 rigidly secured to the side rails of the tractor, front and rear U-shaped channel members 62 and 64 respectively which are interconnected by an intermediate web portion 66, the U-shaped channel members being secured along their bight portions to the plate 60 and provided with upper and lower leg portions. A locking strap 68 is secured below the intermediate web portion 66 to the plate 60 by an apertured member 70. The locking strap is of conventional roller chain construction having a plurality of rollers 72 which are adapted to contact the surface of the first coupling means 48 between the peripheral grooves 50, and link plates 74 which are adapted to ride in the peripheral grooves 50. Secured to one end of the locking strap 68 is a threaded stud 76 carrying locking nuts 78 and 80. The threaded stud 76 is adapted to be secured to an upwardly extending bifurcated member 82 which is rigidly secured to the tractor through plate 60.

To hold the implement in its working position it is only necessary to swing the outrigger frame sections from the transport position illustrated in FIG. 2 to the working position illustrated in FIG. 1, to bring the strap 68 up and around the first coupling means 48 and to secure the strap to the bifurcated member 82 by means of locking nuts 78 and 80 as illustrated in FIGS. 3 and 4. By employing applicant's means to hold the implement in its working position, the implement is free to swing about a horizontally disposed axis adjacent the tractor. To move the implement from its working position to its transport position it is only necessary to release the locking nuts 78 and 80, remove the locking strap 68 from engagement with the cylindrical element 48 and to swing the outrigger frame sections forwardly about the vertical axis of the universal joint 40. To aid in this swinging a wheel 84 is castered to the outer end of each of the outriggers 28 and 30.

In order to hold the outrigger sections in their transport position, first and second extensible and retractable members indicated generally at 86 are secured to the tractor and implement respectively. The outermost member 88 is pivotally secured to the rear transverse frame member 46 by means of an apertured element 90 and pin 92. The member 88 is hollow and is adapted to telescopically receive the associated extensible and retractable member 94. The second member 94 is adapted to be secured to an apertured element 96 on the forward transverse frame member when the implement is in its working position. However, when the implement is to be transported and after the outrigger frames 28 and 30 have been swung substantially forward, the member 94 is disengaged from element 96 and pivotally secured to the forwardly and outwardly extending ear 98 of plate 60. Carried on the first member 88 is a spring pressed detent means 99 which is biased through an aperture (not shown) on first member 88. To hold the implement in its transport position, all that it is necessary to do after pivotally securing the second member to the forwardly and outwardly extending ear 98 is to swing the outrigger frame forwardly until the spring pressed detent 99 is pressed into an aperture (not shown) in the outer end of the second member 94.

To release the transport locking means, all that it is necessary to do is raise the spring pressed detent 99 so that it no longer passes through the aperture in the end of member 94 and telescope member 94 into member 88.

While I have shown and described above the preferred structure in which the principles of the present invention have been incorporated, it is to be understood that my invention is not limited to the exact details shown and described above, but that, in fact, widely different means may be employed in the practice of the broader aspects of my invention.

What I claim, therefore, and desire to secure by Letters Patent is:

1. In the combination of a tractor and implement normally mounted on the side of the tractor, and adaptable to swing about a vertically disposed axis from a working position sideward of the tractor to a transport position forwardly of the tractor, the improvement of means to hold the implement in its working position comprising: first and second coupling members, one of said coupling members being secured to the tractor and the other of said coupling members being secured to the implement, the first coupling member including a horizontally disposed cylindrical element, the second coupling member including front and rear U-shaped channel members having upper and lower leg portion projecting toward the first coupling member, a locking strap secured adjacent the U-shaped channel members to hold the first coupling member within the U-shaped channel members, and threaded means for releasably securing one end of the locking strap to said second coupling member.

2. The invention set forth in claim 1, in which the horizontally disposed cylindrical element has two peripheral grooves, and the locking strap includes a plurality of rollers contacting the surface of the cylindrical element between the two grooves, the rollers being interconnected by plurality of link plates disposed within the two grooves.

3. In the combination of a tractor and a wheeled implement having a center section and two outrigger sections normally mounted to the sides of the tractor, and adaptable to swing about a vertically disposed axis from a working position sideward of the tractor to a transport position forwardly of the tractor, the outriggers also being adapted to swing about a horizontally disposed axis adjacent the tractor, the improvement of means securing the center section to the tractor, a universal joint securing a forward portion of each of the outriggers to the center section, means to hold a rearward portion of each of the outriggers to the tractor in a working position, said holding means including a horizontally disposed grooved cylindrical element secured to a rearward portion of each outrigger, front and rear U-shaped channel members secured along their bight portions to one side of the tractor and having upper and lower outwardly projecting leg portions adapted to embrace the cylindrical element, a locking strap to hold the cylindrical element within the U-shaped channel members, said locking strap including a plurality of rollers to contact the surface of the cylindrical element, the rollers being interconnected by a plurality of link plates adapted to be disposed withing the grooves, one end of the locking strap being secured adjacent one side of the U-shaped channel members, and means mounted adjacent the other side of the U-shaped channel members for releasably securing the other end of the locking strap to the tractor.

4. In the combination of a tractor and implement normally mounted on the side of the tractor, and adaptable to swing about a vertically disposed axis from a working position sideward of the tractor to a transport position forwardly of the tractor, the improvement of means to hold the implement in its working position comprising: first and second coupling members, one of said coupling members being secured to the tractor and the other of said coupling members being secured to the implement, the first coupling member including a horizontally disposed cylindrical element, the second coupling member including a horizontally disposed semicylindrical channel member having upper and lower leg portions projecting towards the first coupling member, a locking strap secured adjacent the channel member to hold the first coupling member within the channel member, and means for releasably securing one end of the locking strap to said second coupling member.

5. The combination of a tractor and an implement normally mounted on the side of the tractor, means pivotally interconnecting the tractor and a forward portion of the implement, a rearward portion of the implement being adapted to be pivotally secured to the tractor when the implement is in its working position, the implement being adapted to swing about the forward pivot means from its working position sideward of the tractor to a transport position forwardly of the tractor, means to hold the implement in its transport position comprising: first and second apertured telescoping members, said aperture means being in alignment when the implement frame is in its transport position, spring pressed detent means mounted on one of said members and adapted to pass through the apertures in both of said members when the implement frame is in its transport position, first bracket means carried by the tractor to the rear of the forward portion of the implement to receive one end of the holding means, second bracket means carried by the implement to receive the other end of the holding means when the implement is in its transport position, and third bracket means carried adjacent the forward pivot means to receive said other end of said holding means when the implement is in its working position.

References Cited in the file of this patent

UNITED STATES PATENTS

| | | |
|---|---|---|
| 1,413,575 | Cochran | Apr. 25, 1922 |
| 2,361,362 | Altgelt | Oct. 31, 1944 |
| 2,474,078 | Wilcox | June 21, 1949 |
| 2,532,164 | Hansen et al. | Nov. 28, 1950 |
| 2,697,617 | Sudenga | Dec. 21, 1954 |
| 2,732,197 | Cornett | Jan. 24, 1956 |
| 2,955,848 | Hyland et al. | Oct. 11, 1960 |